J. THOMSON & E. L. PRATT.
TIRE.
APPLICATION FILED DEC. 24, 1915.
1,185,451.
Patented May 30, 1916.
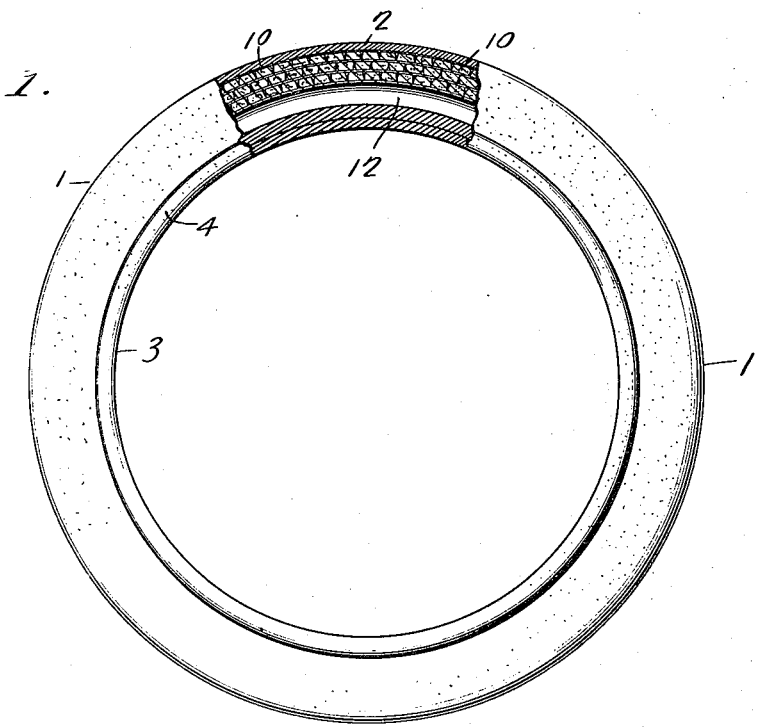
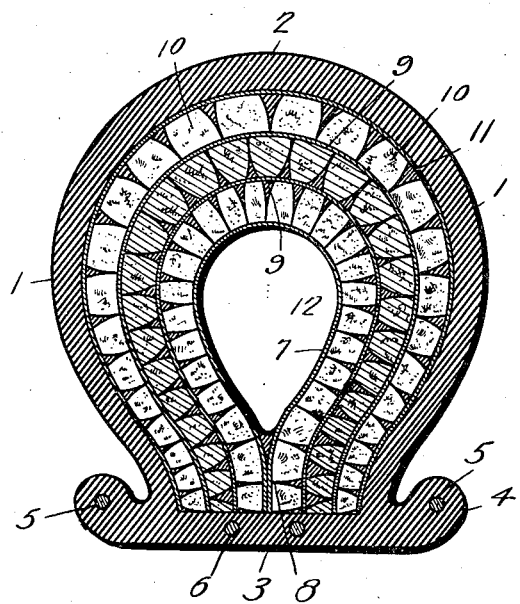
WITNESSES
INVENTORS
JOHN THOMSON,
ERNEST L. PRATT,
BY
ATTORNEYS

UNITED STATES PATENT OFFICE.

JOHN THOMSON AND ERNEST L. PRATT, OF SYRACUSE, NEBRASKA.

TIRE.

1,185,451.  Specification of Letters Patent.  Patented May 30, 1916.

Application filed December 24, 1915. Serial No. 68,527.

*To all whom it may concern:*

Be it known that we, JOHN THOMSON and ERNEST L. PRATT, citizens of the United States, and residents of Syracuse, in the county of Otoe and State of Nebraska, have invented a certain new and useful Improvement in Tires, of which the following is a full, clear, and exact description.

Our invention is an improvement in tires for automobiles and like vehicles, and has for its object the provision of a tire wherein the internal resistance increases with the external pressure, and which, while simple in construction and inexpensive, will be puncture and blow-out proof.

In the drawings: Figure 1 is a side view of a tire constructed in accordance with the invention, a part of the tire being broken away, and Fig. 2 is a transverse section.

In the present embodiment of the invention, the tire is composed of an outer layer or annular casing 1 of rubber, which is somewhat thicker at the tread, as indicated at 2, and gradually decreases in thickness, along the side to the base 3.

The base is flat and is extended at each side of the tire, as indicated at 4, the extended edges being thickened or enlarged, and a continuous wire ring 5 is arranged in each of the said edges. Other similar wire rings 6 are inserted in the base at each side of the transverse center.

An inner layer 7 of canvas is provided, the said layer being formed from a sheet having its side edges superposed or lapped upon each other, as indicated at 8, and the edges abut against the inner face of the base at approximately the transverse center thereof.

A plurality of layers 9 of canvas similar to the layer 7 are arranged between the casing 1 and the inner layer 7, and the said layers 9 are spaced apart from each other to form the inner and outer layers. In the present instance, three layers of canvas are provided, including the layer 7, but it is obvious that this number may be increased as described.

The layers 9 are formed from strips bent into channel form and the edges of the strips abut against the inner face of the base. Between each layer and the adjacent layer is arranged a filling of elastic or resilient blocks 10 of cork or like material. Each of the blocks is approximately frusto-conical in shape and is arranged with its long axis radial to the tire.

The series or layer of blocks between the casing 1 and the adjacent layer 9 and the series or layer between the inner layer 7 and the adjacent layer 9 are arranged with their large ends inwardly, while the layer or series of blocks between the two layers 9 are arranged in the opposite manner, that is with their large ends outward.

The interspaces between the blocks, or rather between the small ends of the blocks, is filled with rubber as indicated at 11, so that a practically solid structure is formed. If for instance pressure is exerted on the tread, as by engaging a stone or like obstruction, the rubber filling 11 in the first layer is compressed at that particular point, while on all sides, and in the rear the filling will be extended or stretched.

The filling of the second layer at the point of deflection caused by the tire coming in contact with the stone, tends to stretch and the filling of the third layer will be compressed, thus preventing the flattening of the tire.

An air space 12 is provided at the center of the tire, and preferably the blocks 10 at the tread of the tire are of greater length than at the sides, so that the tread of the tire is of greater thickness than at the sides.

The tire so constructed is puncture proof, and even were the layers pierced the cork filling would by its expansion prevent any opening being formed. The resiliency of the tire does not depend upon the air space altogether.

While the tire shown is of the clencher type, it is obvious that it might with equal facility be of any other shape. The wire rings 5 and 6 hold the tire firmly on the wheel and it is obvious that an inner tube or casing might be used if desired.

We claim:

1. A tire composed of an annular outer casing of rubber, provided with a flat base having extended and enlarged side edges and a tread of greater thickness than the sides, a plurality of layers of canvas, each layer being composed of a strip bent into channel form, and having its side edges abutting against the inner face of the base of the outer casing, the layers being spaced apart from the outer casing and from each other, a filling of cork blocks arranged between the adjacent layers and between the casing and the adjacent layer, said blocks being approximately frusto-conical in shape and having their axes approximately perpendicular to the layers, the innermost and the outermost layers of blocks being arranged with their large ends inward, and the intermediate layer of blocks being arranged with their large ends outward, and a filling of rubber between the small ends of each series of blocks.

2. A tire composed of an outer annular casing of rubber provided with a base, a plurality of layers of canvas, each layer being composed of a strip bent into channel form, and having its side edges abutting against the inner face of the base of the outer casing, the layers being spaced apart from each other, a filling of cork blocks arranged between the adjacent layers, and between the casing and the adjacent layer, said blocks being approximately frusto-conical in shape and having their axes approximately perpendicular to the layers, the innermost and the outermost layers of blocks being arranged with their large ends inward, and the intermediate layer of blocks being arranged with their large ends outward, and a filling of rubber between the small ends of each series of blocks.

3. A tire composed of an outer annular casing of rubber, provided with a flat base having extended and enlarged side edges and a tread of greater thickness than the sides, a plurality of layers of canvas, each layer being composed of a strip bent into channel form, and having its side edges abutting against the inner face of the base of the outer casing, the layers being spaced apart from the outer casing and from each other, a filling of cork blocks arranged between the adjacent layers and between the casing and the adjacent layer, said blocks being approximately frusto-conical in shape and having their axes approximately perpendicular to the layers, and a filling of rubber in the interspaces between the blocks.

4. A tire composed of an outer annular casing of rubber, provided with a flat base having extended and enlarged side edges and a tread of greater thickness than the sides, a plurality of layers of canvas, each layer being composed of a strip bent into channel form, and having its side edges abutting against the inner face of the base of the outer casing, the layers being spaced apart from the outer casing and from each other, a filling of cork blocks arranged between the adjacent layers and between the casing and the adjacent layer, said blocks being approximately frusto-conical in shape and having their axes approximately perpendicular to the layers.

5. A tire composed of an outer annular casing of rubber, provided with a flat base having extended and enlarged side edges and a tread of greater thickness than the sides, a plurality of layers of canvas, each layer being composed of a strip bent into channel form and having its side edges abutting against the inner face of the base of the outer casing, the layers being spaced apart from the outer casing and from each other, a filling of cork blocks arranged between the adjacent layers and between the casing and the adjacent layer, and a filling of rubber in the interspaces between the blocks.

6. A tire composed of an outer annular casing of rubber, provided with a flat base having extended and enlarged side edges and a tread of greater thickness than the sides, a plurality of layers of canvas, each layer being composed of a strip bent into channel form, and having its side edges abutting against the inner face of the base of the outer casing, the layers being spaced apart from the outer casing and from each other, a filling of cork blocks arranged between the adjacent layers and between the casing and the adjacent layer.

7. A tire composed of an outer layer or casing of rubber and a plurality of inner layers of fabric material spaced apart from each other and from the outer casing, and a series of elastic blocks arranged between each two adjacent layers and between the casing and adjacent layer, each block being approximately frusto-conical and having its long axis approximately perpendicular to the layers, the members of the outermost series of blocks having their large ends inward, and a filling of elastic material in the interspaces between the blocks of each series, the blocks at the tread being of greater length than the blocks at the sides.

8. A tire composed of an outer layer or casing of rubber and a plurality of inner layers of fabric material spaced apart from each other and from the outer casing, and a series of elastic blocks arranged between each two adjacent layers and between the casing and adjacent layer, each block being approximately frusto-conical and having its long axis approximately perpendicular to the layers, the members of the outermost series of blocks having their large ends inward and the adjacent series having their large ends outward, and a filling of elastic material in the interspaces between the blocks of each series.

9. A tire composed of an outer layer or casing of rubber and a plurality of inner layers of fabric material spaced apart from each other and from the outer casing, and a series of elastic blocks arranged between each two adjacent layers and between the casing and adjacent layer, each block being approximately frusto-conical and having its long axis approximately perpendicular to the layers, and a filling of elastic material between the blocks of each series.

10. A tire composed of an outer layer or casing of rubber and a plurality of inner layers of fabric material spaced apart from each other and from the outer casing, and a series of elastic blocks arranged between each two adjacent layers and between the casing and adjacent layer, and a filling of elastic material between the blocks of each series.

11. A tire composed of an outer layer or casing of rubber and a plurality of inner layers of fabric material spaced apart from each other and from the outer casing, and a series of elastic blocks arranged between each two adjacent layers and between the casing and adjacent layer, each block being approximately frusto-conical and having its long axis approximately perpendicular to the layers.

12. A resilient tire comprising a plurality of circumferentially arranged and transversely curved layers, each of the layers consisting of tapering elastic blocks, and elastic filling in the interstices between the elastic blocks, certain layers having the small ends of the blocks facing outward, and the remaining layers having the small ends of the blocks facing inward.

13. A resilient tire comprising a plurality of layers, each of the layers consisting of tapering elastic blocks, and elastic filling in the interstices between the elastic blocks, the blocks of the outermost layer having their small ends facing outward, and the remaining layers being disposed with the small ends of the blocks of one layer facing in an opposite direction to the small ends of the adjacent blocks of the adjacent layer and with the small ends of the blocks of the layer next to the outermost layer facing inward.

14. A resilient tire comprising a casing and layers within the casing extending along the tread and sides thereof, each of the layers embodying tapering elastic blocks, and elastic filling in the interstitial spaces between the blocks, the blocks of the outermost layer gradually decreasing in length from the tread toward the base of the tire.

JOHN THOMSON.
ERNEST L. PRATT.

Witnesses:
   FRITZ NICKLAS,
   JAMES FAIRHEAD.